United States Patent
Grosse et al.

(10) Patent No.: US 12,515,751 B2
(45) Date of Patent: Jan. 6, 2026

(54) BODY STRUCTURE FOR AN ELECTRICALLY OPERABLE PASSENGER VEHICLE

(71) Applicant: Bayerische Motoren Werke Aktiengesellschaft, Munich (DE)

(72) Inventors: Ronny Grosse, Eichenau (DE); Si-Lam Nguyen, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 453 days.

(21) Appl. No.: 18/018,608

(22) PCT Filed: Jul. 1, 2021

(86) PCT No.: PCT/EP2021/068219
§ 371 (c)(1),
(2) Date: Jan. 30, 2023

(87) PCT Pub. No.: WO2022/022941
PCT Pub. Date: Feb. 3, 2022

(65) Prior Publication Data
US 2024/0034426 A1    Feb. 1, 2024

(30) Foreign Application Priority Data
Jul. 31, 2020   (DE) .................... 10 2020 120 219.9

(51) Int. Cl.
*B62D 65/18*    (2006.01)
*B62D 25/08*    (2006.01)

(52) U.S. Cl.
CPC ............. *B62D 65/18* (2013.01); *B62D 25/08* (2013.01)

(58) Field of Classification Search
CPC ................................. B62D 65/18; B62D 25/08
See application file for complete search history.

(56) References Cited

U.S. PATENT DOCUMENTS

| 2,672,230 A | * | 3/1954 | Jetzke | ........................ | B66C 1/34 |
| | | | | | 248/341 |
| 6,010,181 A | * | 1/2000 | Robbins | ............... | B60G 15/063 |
| | | | | | 296/203.04 |

(Continued)

FOREIGN PATENT DOCUMENTS

| CN | 1572682 A | 2/2005 |
| CN | 101284553 A | 10/2008 |

(Continued)

OTHER PUBLICATIONS

Translation of KR101859459B1 (Year: 2025).*

(Continued)

*Primary Examiner* — Jason S Morrow
(74) *Attorney, Agent, or Firm* — Crowell & Moring LLP

(57) ABSTRACT

A body structure for an electrically operable passenger vehicle includes at least one carrier element with which the body structure can be fixed in the region of a retaining contour on at least one retaining element of a conveyor system in the production of the passenger vehicle. In order to allow body structures for both bodies of passenger vehicles provided with an internal combustion engine and for bodies of passenger vehicles provided with an electric drive to be retained, the retaining contour is formed on the carrier element at least partially via an adapter part arranged on same.

8 Claims, 6 Drawing Sheets

(56) References Cited

U.S. PATENT DOCUMENTS

| | | | | |
|---|---|---|---|---|
| 6,088,918 | A * | 7/2000 | Corporon | B60G 15/063 |
| | | | | 29/469 |
| 6,299,240 | B1 * | 10/2001 | Schroeder | B62D 29/008 |
| | | | | 296/29 |
| 9,096,277 | B2 * | 8/2015 | Grosse | B62D 25/20 |
| 10,145,408 | B2 * | 12/2018 | MacArthur | B66C 1/36 |
| 10,532,783 | B2 * | 1/2020 | Taylor | B62D 65/022 |
| 11,492,057 | B2 * | 11/2022 | Miyake | B62D 65/022 |
| 2008/0251354 | A1 | 10/2008 | Ruggaber et al. | |
| 2009/0250346 | A1 | 10/2009 | Weschke et al. | |
| 2012/0097466 | A1 | 4/2012 | Usami et al. | |
| 2014/0015238 | A1 * | 1/2014 | Juettner | B60K 15/067 |
| | | | | 180/68.5 |
| 2019/0202010 | A1 * | 7/2019 | Akami | B23K 37/04 |
| 2019/0276083 | A1 | 9/2019 | Saunders et al. | |

FOREIGN PATENT DOCUMENTS

| | | | |
|---|---|---|---|
| DE | 297 22 344 U1 | 5/1999 | |
| DE | 102 97 137 T5 | 8/2004 | |
| DE | 10 2006 055 297 A1 | 5/2008 | |
| DE | 20 2007 009 014 U1 | 12/2008 | |
| DE | 10 2008 045 005 A1 | 3/2010 | |
| DE | 10 2010 005 079 A1 | 7/2011 | |
| DE | 10 2011 116 684 A1 | 4/2012 | |
| DE | 10 2011 116 684 B4 | 2/2016 | |
| DE | 10 2017 101 908 A1 | 8/2018 | |
| DE | 10 2019 105 581 A1 | 9/2019 | |
| DE | 10 2019 003 314 A1 | 1/2020 | |
| KR | 101859459 B1 * | 6/2018 | ............ B66C 11/12 |
| KR | 102352818 B1 * | 1/2022 | ........... B62D 65/022 |
| WO | WO 2017/005509 A1 | 1/2017 | |

OTHER PUBLICATIONS

Translation of KR102352818B1 (Year: 2025).*

International Search Report (PCT/ISA/210) issued in PCT Application No. PCT/EP2021/068219 dated Sep. 30, 2021 with English translation (four (4) pages).

German-language Written Opinion (PCT/ISA/237) issued in PCT Application No. PCT/EP2021/068219 dated Sep. 30, 2021 (five (5) pages).

German-language Office Action issued in German Application No. 10 2020 120 219.9 dated Mar. 10, 2021 (six (6) pages).

English translation of Chinese-language Office Action issued in Chinese Application No. 202180060277.1 dated Dec. 8, 2024 (8 pages).

* cited by examiner

BODY STRUCTURE FOR AN ELECTRICALLY OPERABLE PASSENGER VEHICLE

BACKGROUND AND SUMMARY

The invention relates to a body structure for an electrically operable passenger vehicle. The invention further relates to a modular system for such a body structure and a method for producing such a body structure.

During the production of bodies for passenger vehicles, a plurality of modular body structures, such as, for example, a rear vehicle structure, a front vehicle structure, a base structure and other assemblies/modules or individual components are usually joined together. In this instance, the individual body structures, that is to say, the individual modules of the overall body of the passenger vehicle have to be, for example, moved to an installation in which the respective modules are joined/welded to each other. This is usually carried out by means of conveying installations in which the respective modules or body structures are, for example, conveyed in a suspended manner. The respective body structure generally has in this instance at least one carrier element, by means of which the body structure can be fixed in the region of a receiving contour to at least one receiving element, for example, a suspension hook on the conveying installation.

In the course of the most flexible possible production of passenger vehicles with different drive concepts, it is additionally desirable to use body structures, such as, for example, the rear vehicle structure, in a manner which covers as far as possible structural variants for different drive concepts, that is to say, not only for passenger vehicles having purely an internal combustion engine (ICE), but also in ones which have an electric drive (BEV, PHEV). However, slight variations of these body structures which cover structural variants per se may occur in order, for example, to take into account the specific circumstances of the respective drive concept. Thus, for example, with a body structure which is in the form of a rear structure or rear vehicle structure, it is necessary to select a different construction type in the region of the heel plate. Precisely in the region of this heel plate, however, as explained above, there is generally arranged the carrier element by means of which the body structure can be fixed in the region of a receiving contour to at least one receiving element, for example, a suspension hook, of the conveying installation. A change of the body structure in a manner specific to the structural variant in the region of the carrier element therefore leads to the body structure not being able to be readily transported for all structural variants of the passenger vehicle (ICE, BEV, PHEV) in a uniform manner by means of one and the same suspension hook or similar receiving element.

An object of the present invention is therefore to provide a body structure and a modular system and a method of the type mentioned in the introduction by means of which body structures for different drive concepts of passenger vehicles can be conveyed.

This object is achieved according to the invention by means of a body structure, a modular system, and a method for producing a body structure, having the features of the independent claims. Advantageous developments of the invention are set out in the dependent claims.

The body structure according to the invention which is, for example, in the form of a rear structure or rear vehicle structure of an electrically operable motor vehicle, comprises at least one carrier element, in particular a cross beam, by means of which the body structure, in particular the rear vehicle structure, can be fixed in the region of a receiving contour to at least one receiving element, in particular a suspension hook, of a conveying installation during the production of the passenger vehicle.

In order in this instance to make it possible to provide body structures both for bodies of passenger vehicles which are provided with an internal combustion engine (ICE) and for bodies of passenger vehicles which are provided with an electric drive (BEV, PHEV), there is provision according to the invention for the receiving contour of the carrier element to be at least partially formed by means of an adapter component which is arranged thereon. As a result of the arrangement of the adapter component on the carrier element, consequently, there can be provided a receiving contour which corresponds to the receiving contour which body structures have, for example, for passenger vehicles having purely an internal combustion engine. In other words, as a result of the adapter component according to the invention, the body structure for an electrically operable passenger vehicle can be adapted to a body structure for a passenger vehicle exclusively having a combustion engine in the region of the receiving contour in which the respective body structure is contacted by one and the same receiving element or suspension hook of the conveying installation. Consequently, using one and the same conveying installation, body structures for vehicles having different drive concepts can be transported in order to provide a production system which is as diversified as possible with a high degree of flexibility.

On the whole, it is consequently possible to take into account that for body structures of different drive concepts, that is to say, for example a rear vehicle structure for a passenger vehicle having purely an internal combustion engine (ICE) and a rear vehicle structure for an electrically operable passenger vehicle (BEV, PHEV), different carrier elements are provided, for example, in the region of the heel plate, wherein the receiving contour of both carrier elements or body structures can be standardized at least at the relevant locations by a corresponding adapter component being used in the body structure for the electrically operable motor vehicle in order to form the receiving contour of the carrier element, as also used for the body structure for motor vehicles purely with a combustion engine. Naturally, it would also in principle be possible in a transposed manner, that is, to provide the adapter component in the rear vehicle structure for bodies of vehicles which are driven purely with an internal combustion engine and thus to adapt to the rear vehicle structure for bodies of at least partially electrically driven vehicles.

In another embodiment of the invention, it has been found to be advantageous for the adapter component to be inserted into a hollow space of the carrier element. In the case of a rear vehicle structure, the adapter component may in this instance in particular be inserted in a carrier element which is in the form of a so-called dual heel plate, that is to say, a dual-wall carrier component between which the adapter component is arranged. A concealed arrangement of the adapter component which in addition is particularly space-saving is thereby produced. In addition, the adapter component is consequently advantageously arranged in the dry region of the body.

In another embodiment of the invention, the body structure is in the form of a rear vehicle structure which comprises a carrier element which is arranged in the region of a heel element. As explained above, such a heel element in a body structure for an electrically operable motor vehicle (BEV) must look different from the one for a rear vehicle structure of a passenger vehicle having purely an internal combustion engine (ICE), for example, since, as a result of the heel element, the receiving space for the underfloor energy storage device is limited.

In another embodiment, the adapter component forms respective contact faces for the suspension hook. The contact faces preferably extend in this instance at a corresponding angle with respect to each other so that the body structure or rear vehicle structure can be reliably fixed to the corresponding receiving element, in particular to the suspension hook.

In this context, it has been found to be further advantageous for the carrier element, in particular the heel element, to have an opening through which the suspension hook can engage. The arrangement of the adapter component within the hollow space of the carrier element or the heel element is thereby possible. In this context, it has further been found to be advantageous for the opening to be subsequently closed by a closure member. On the one hand, a dry space of the body can thereby be closed and the penetration of dirt into the carrier element or heel element can be prevented and, on the other hand, a load path between the carrier element or heel element and the lateral adjacent side sill can be closed, whereby advantages can be afforded with regard to the rigidity and the stability of the body.

The advantages described in connection with the body structure according to the invention apply in exactly the same manner to the modular system according to the invention and the method for producing such a body structure according to the invention. By means of the modular system or the associated method, it is consequently possible to produce in a simple manner body structures which cover structural variants for passenger vehicles with different drive concepts (ICE, BEV, PHEV), which, on the one hand, in a part-region have structural-variant-specific components, such as, for example, a carrier element, but which, on the other hand, in the region of this respective structural-variant-specific carrier element have a receiving contour which covers structural variants so that the body structures of all passenger vehicles can be fixed to a corresponding receiving element/suspension hook of the conveying installation in a uniform manner. In this instance, the adaptation of the receiving contour which covers structural variants is carried out by using an adapter element in the region of the structural-variant-specific carrier element.

Other features of the invention will be appreciated from the claims, the Figures and the description of the Figures. The features and feature combinations set out above in the description and the features and feature combinations set out below in the description of the Figures and/or shown only in the Figures can be used not only in the combination set out in each case, but also in other combinations or alone.

The invention will now be explained in greater detail with reference to a preferred embodiment and with reference to the drawings.

DETAILED DESCRIPTION OF THE DRAWINGS

Figure 1:
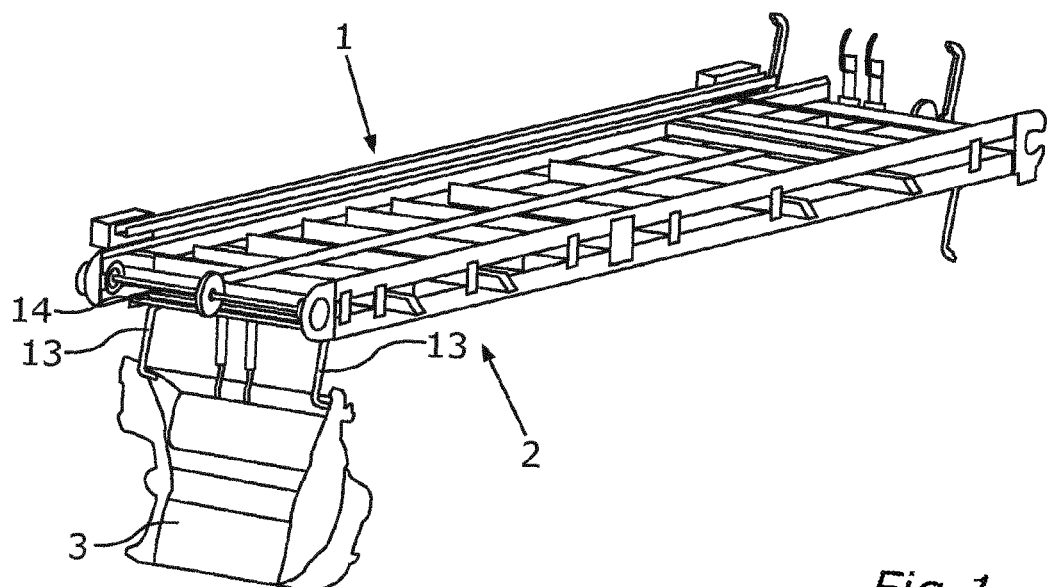
FIG. 1 is a cut-out perspective view of a conveying installation during the production of a motor vehicle having a suspension gear, to the suspension hook of which a respective body structure for a passenger vehicle can be fixed.

FIG. 1 shows a perspective view of a conveying installation 1 during the production of passenger vehicles. The conveying installation 1 comprises in this instance a suspension gear 2 by means of which in this instance body structures in the form of body rear ends or rear vehicle structures 3 can be transported in a suspended manner.

Figure 2:
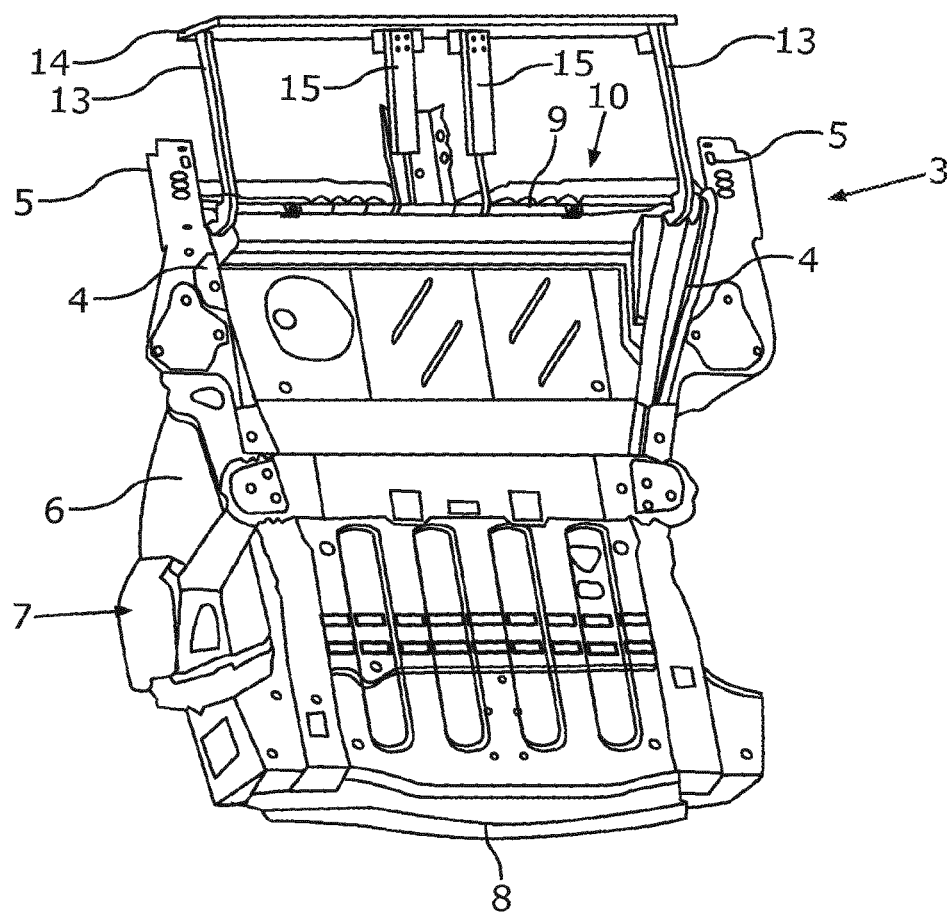
FIG. 2 is a perspective view of a body structure in the form of a rear vehicle structure for a passenger vehicle exclusively having an internal combustion engine, which comprises a carrier element which is arranged in the region of a heel element and by means of which the rear vehicle structure is fixed to respective suspension hooks of the conveying installation according to FIG. 1.

One of these rear vehicle structures 3 is shown in FIG. 2 as a perspective view in an enlarged state with respect to FIG. 1. In this instance, it is the rear vehicle structure 3 of a motor vehicle having purely an internal combustion engine (ICE), that is to say, without an electric drive. The rear vehicle structure 3 comprises in this instance respective lateral longitudinal beams 4 which are connected in a front end region 5 to respective rear ends of a main base structure which cannot be seen as an additional module. Above these longitudinal beams 4 it is possible to see rear wheel housings 7 which correspond to respective inner components 6 and against which during the subsequent bodyshell manufacturing respective side wall portions are placed. Toward the rear end, the rear vehicle structure 3 terminates at a cross beam 8 which connects the longitudinal beams 4 to each other at the rear end.

Another carrier element 9—as can be seen below in greater detail in conjunction with FIGS. 3a and 3b—is part of a heel element or part of a heel wall 10 which extends at the front end or in this instance the upper end of the rear vehicle structure 3 in a transverse vehicle direction and substantially horizontally between the two longitudinal beams 4 or is connected thereto at the end.

Figure 3A:
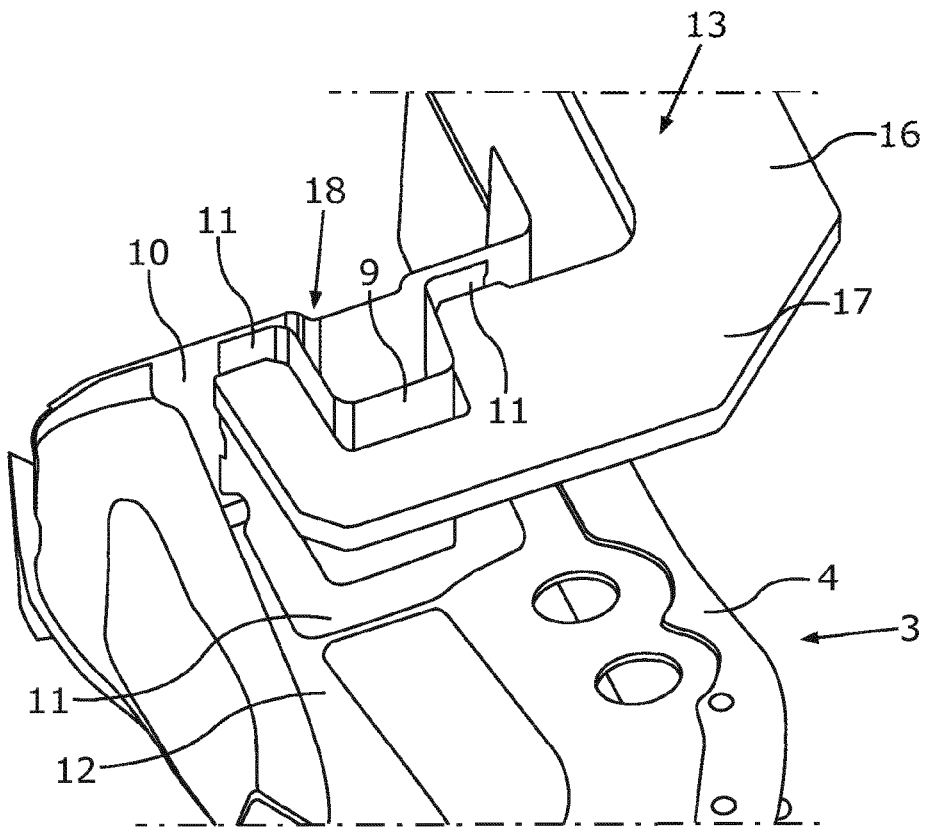
FIGS. 3a-b are a sectioned perspective view and a lateral sectioned view through the rear vehicle structure for a passenger vehicle exclusively having an internal combustion engine according to FIG. 2 in the region of a receiving contour of the carrier element for the corresponding suspension hook.
Figure 3B:
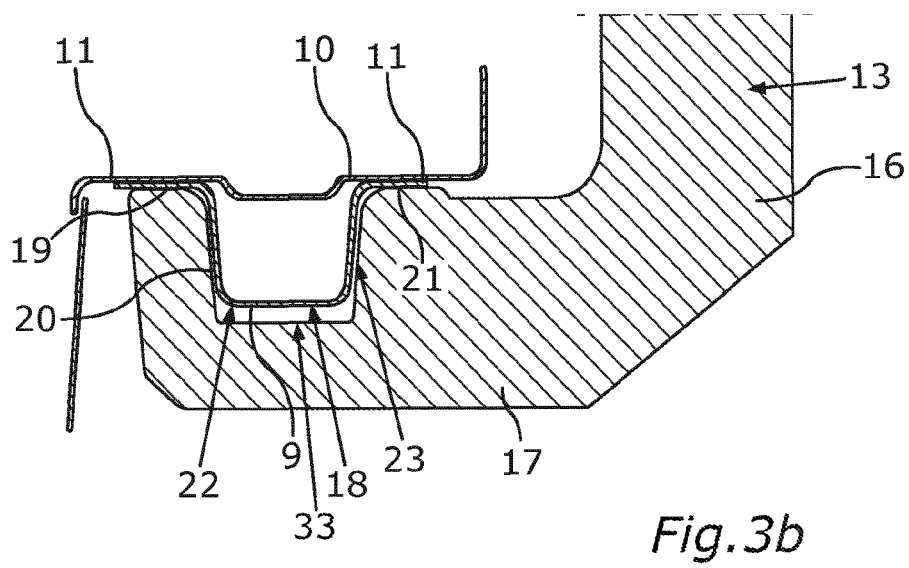

As can be seen in FIGS. 3a and 3b in a cut-out and enlarged, sectioned perspective view or a lateral sectioned view of the rear vehicle structure according to FIG. 2, the carrier element 9 is in this instance in the form of a formed sheet metal component which is at least substantially U-shaped in cross section and which is joined using respective flanges 11 from the rear against the at least substantially planar heel plate or heel element 10 which extends in the transverse vehicle direction or in the vertical vehicle direction. Furthermore, the flanges 11 also extend in the region of the respective end of the carrier element 9 so that using the respective flanges 11 it is also joined to a corresponding inner side 12 of the respective laterally associated longitudinal beam 4. For example, a weld connection is suitable as a joint connection, in particular a spot welding connection or other known joint connections. As a result of the connection of the two structural elements—the carrier element 9 and the heel element 10—there is consequently formed on the whole over a part-height of the heel element 10 a substantially rectangular or square cross beam which is closed circumferentially at the outer circumference and which connects the longitudinal beams 4 to each other and reinforces the heel element 10.

Furthermore, in conjunction with FIGS. 2 to 3b, it can be seen that the body structure or rear vehicle structure 3 can be fixed by means of the carrier element 9 to, in this instance, two receiving elements in the form of suspension hooks 13 of the conveying installation 1. The two suspension hooks 13 are in this instance—as can be seen in FIG. 2—arranged on a transverse element 14 together with additional retention members 15 in order to stabilize the rear vehicle structure 3 in the desired, suspended position.

FIGS. 3a and 3b clearly show that the respective suspension hook 13 has a leg 17 which is bent with respect to an at least substantially vertically extending leg 16 or which extends perpendicularly relative thereto and in which a hook receiving member 33 which corresponds to a receiving contour 18 on the rear vehicle structure is formed. In particular in FIG. 3b, it can be seen in this instance that the receiving contour 18 and the hook receiving member 33 have substantially two mutual contact faces 19 and 20 on which the carrier element 9 or the heel element 10 is supported. In particular, it can also be seen that between the receiving contour 18 and the hook receiving member 33 it has slot-like free spaces 21, 22, 23 in which the receiving contour 18 has no contact with the carrier element 9. As a result of the free spaces 21, 22, 23, dual fits are evidently prevented and a secure receiving and fixing of the carrier element 9 within the receiving contour 18 are ensured. Consequently, safe transport of the rear vehicle structure 3 is achieved.

During the production of passenger vehicles, however, it is desirable to maintain a high degree of flexibility, that is to say, where possible to be able to produce vehicles having different drives within one production line, that is to say, as in this instance exclusively with an internal combustion engine (ICE), but also with an exclusively electric drive (BEV) or with a hybrid drive (PHEV). In this instance, it is further desirable to provide body structures, in the present case rear vehicle structures 3, which cover structural variants for all drive types in order to be able to operate a high common parts strategy.

In this instance, this is achieved by the respective rear vehicle structures 3 of the bodies of the passenger vehicles of all drive types being constructed to be at least substantially identical and to be modified in a structural-variant-specific manner only at those locations where it is necessary.

In this instance, the modification is now intended to be explained with reference to FIGS. 4 to 5c which are required for a rear vehicle structure 3 for a body of a passenger vehicle having an electric drive (BEV, PHEV).

Figure 4:
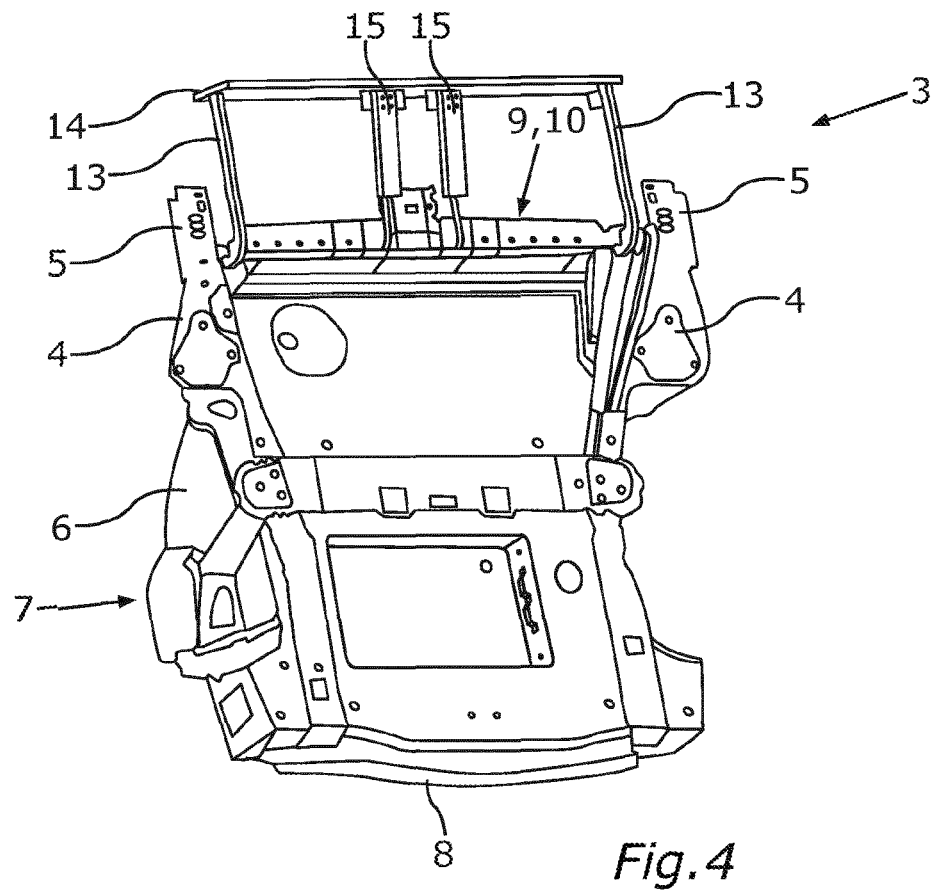
FIG. 4 is a perspective view of a body structure in the form of a rear vehicle structure of an electrically operable passenger vehicle similar to FIG. 1, wherein the rear vehicle structure is again fixed to respective suspension hooks of the conveying installation.

Accordingly, FIG. 4 shows in a similar manner to FIG. 2 the suspended fixing of the rear vehicle structure 3 on the suspension gear 2 of the production installation 1 using the respective suspension hooks 13. The rear vehicle structure 3 for a body of a passenger vehicle with an electric drive (BEV, PHEV) has in comparison with the ones for a motor vehicle exclusively having an internal combustion engine inter alia a carrier element 9 which is constructed differently and a cover member in the base region, in which electronic components are accommodated.

Figure 5A:
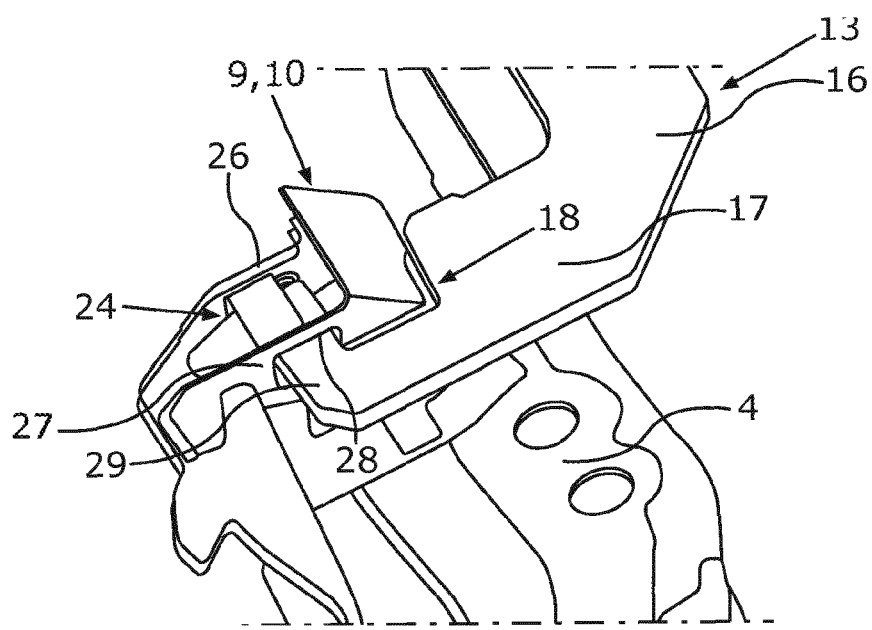
FIGS. 5a-d are a perspective sectioned view, a cut-out perspective view, a perspective sectioned view and a lateral sectioned view of the carrier element, which is constructed in a structural-variant-specific manner, of the rear vehicle structure of an electrically operable passenger vehicle according to FIG. 4 in the region of the heel element, wherein in order to achieve a receiving contour which is uniform or which covers structural variants, an adapter component which in this instance partially forms the receiving contour of the carrier element for the respective suspension hook is inserted into the carrier component of the heel element.
Figure 5B:
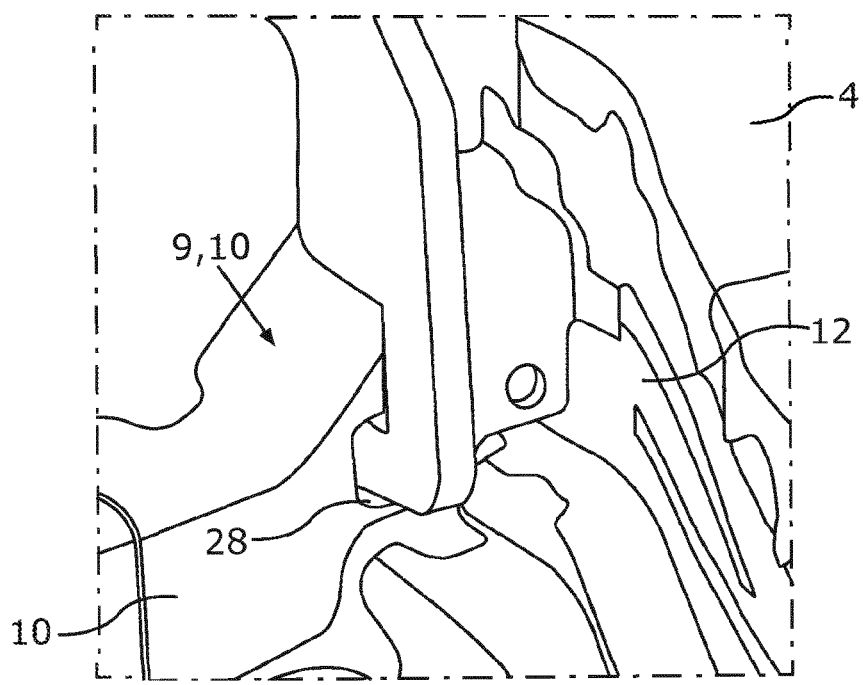
Figure 5C:
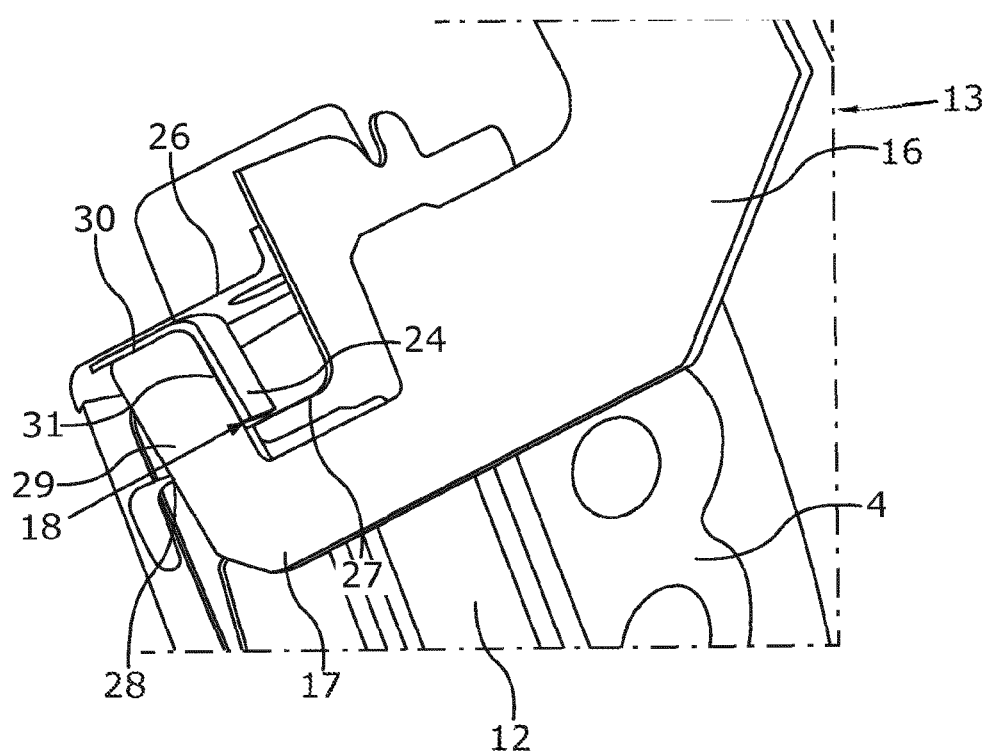
Figure 5D:
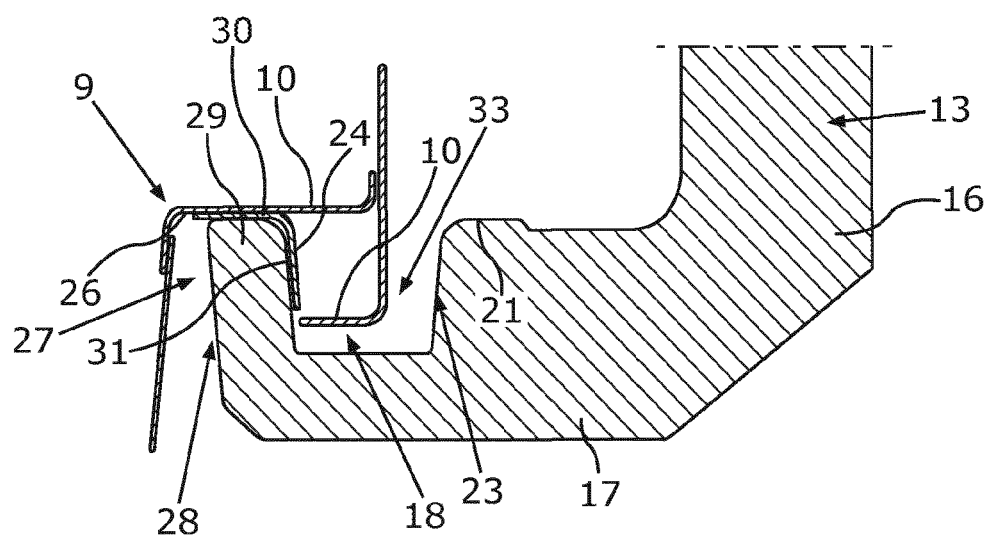

In particular in conjunction with FIGS. 5a and 5d, which show a perspective sectioned view and a planar sectioned view of the rear vehicle structure 3 in the region of the heel element 10, it can also be seen that the heel element 10 for the rear vehicle structure 3 is constructed in a structural-variant-specific manner differently from the heel element 10 with the carrier element 9 according to FIGS. 3a and 3b for the body of a passenger vehicle purely having an internal combustion engine. This is because it can be seen in particular in FIGS. 5a and 5d that there is provided at that location a dual-wall heel element 10 which as a result of the dual-wall nature thereof itself forms the carrier element 9 or the cross beam. Therefore, whilst in the embodiment according to FIGS. 3a and 3b, the carrier element 9 is connected at the rear side to the heel element or heel plate 10, according to the embodiment according to FIGS. 4 to 5d with the rear vehicle structure 3 for bodies for passenger vehicles with an electric drive, the dual-wall heel element 10 which forms the carrier element 9 is provided. The carrier element 9 as a part of the heel element 10 is consequently constructed in a structural-variant-specific manner with an otherwise substantially identical rear vehicle structure which covers structural variants. Or, in other words: the adaptation of the otherwise at least substantially identical rear vehicle structure 3 to the respective drive concept, in this instance to the one with electric drives, is carried out in particular by means of modification of the carrier element 9 of the heel element 10.

So that the uniform suspension hook 13 of the suspension gear 2 of the conveying installation 1 as already described above can also be used for transporting the rear vehicle structures 3 in electric drives, in order to thereby achieve a high degree of flexibility in the production, it can be seen that an adaptation of the receiving contour 18 for the respective suspension hook 13 is required.

This is carried out—as can be seen in particular in FIG. 5a— by means of an adapter component 24, which in this instance is inserted into a hollow space 27 of the carrier element 9 and in particular fixed to an inner side 26 of the front heel wall 10, in particular joined. The adapter component 24 may, for example, be in the form of a formed sheet metal component, cast metal component or the like. Where applicable, production from plastics material would also be conceivable.

So that the respective suspension hook 13 can engage in the carrier element 9, an opening 28 is introduced from the rear side of the carrier element 9 or heel element 10 in the region of the adapter component 24 within the rear heel wall 10. Via the opening 28, consequently, a free end 29 of the leg 17 of the suspension hook 13 can engage in the adapter component 24. Particularly, FIG. 5d clearly shows that it is the same suspension hook 13 as also used in rear vehicle structures for vehicles purely having an internal combustion engine (ICE). Or, in other words: the suspension hooks 3 have the same shape in both cases.

As can be seen in particular in FIGS. 5c and 5d, in this instance the receiving contour 8 of the carrier element 9 for the suspension hook 13 is formed at least partially—in the example even completely—by the adapter component 24. More specifically, the adapter component 24 forms with the hook receiving member 33 respective contact faces 30, 31 of the receiving contour 18 on which the free end 29 of the leg 27 of the suspension hook is supported when the rear vehicle structure 3 is fixed. For example, however, it would also be conceivable for the inner side 26 of the front heel wall 10 to form the contact face 30 of the receiving contour 18 for the suspension hook 13.

On the whole, it can consequently be seen that, as a result of the adapter component 24, a modular system and a method for producing body structures 3 by means of this modular system is provided in order to adapt the receiving contour 18 for the suspension hook 13 which is always intended to be used over all the structural variants of the rear vehicle structure 3 by the adapter component 24 being arranged in the region of the carrier element 9 in order to produce in the rear vehicle structure 3 for bodies of passenger vehicles with electric drives (BEV, PHEV) an at least substantially identical receiving contour which is identical to that of the rear vehicle structure 3 for bodies of motor vehicles purely having an internal combustion engine (ICE). Consequently, on the one hand, rear vehicle structures which per se cover structural variants and which are constructed partially in a structural-variant-specific manner can be conveyed by means of a uniform conveying installation 1.

Figure 6A:
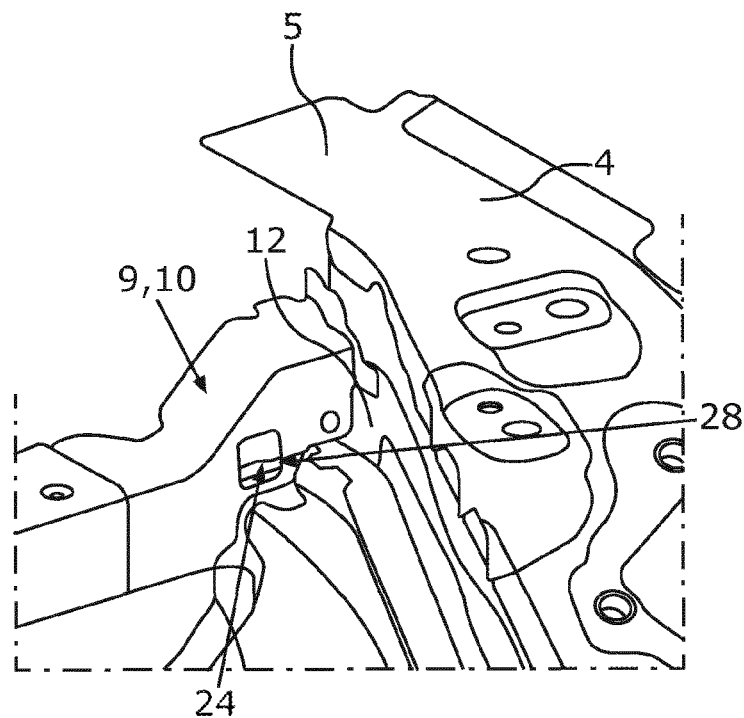
FIGS. 6a-b are respective cut-out perspective views of the rear vehicle structure according to FIGS. 4 to 5c in the region of the carrier element of the heel element, wherein according to FIG. 6a, there can be seen an opening, via which the corresponding suspension hook engages in the carrier element and which according to FIG. 6b is subsequently closed by means of a closure member.
Figure 6B:
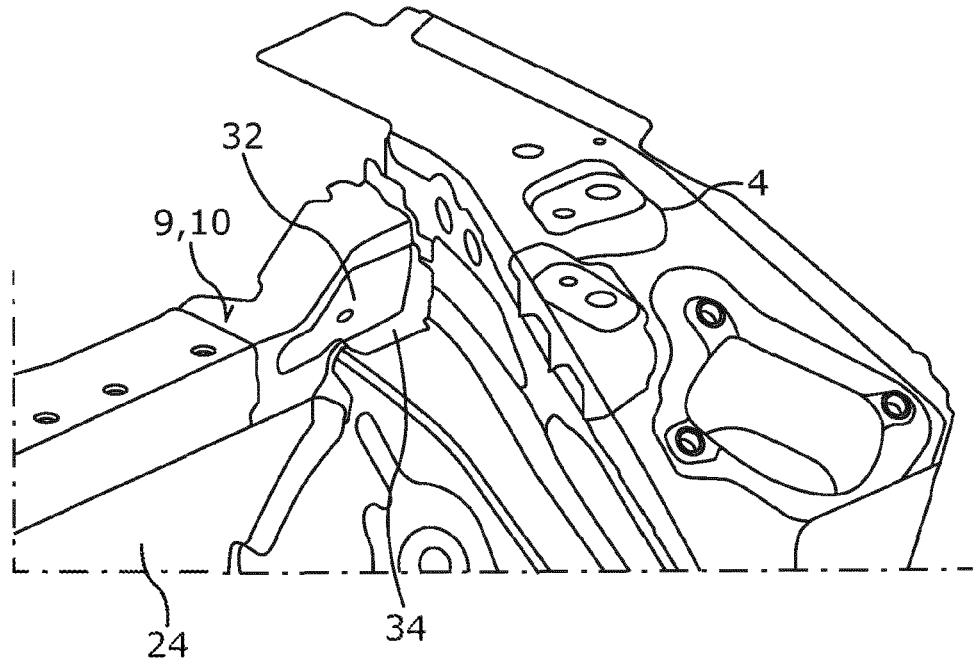

Finally, FIGS. 6a and 6b show respective perspective views of the rear vehicle structure 3 according to FIGS. 4 to 5c in the region of the connection location of the carrier element 9 or the dual-wall heel element on the corresponding longitudinal beam 4. FIG. 6a shows in this instance the opening 28 inside the heel wall 10 or the carrier element 9 so that the free end 29 of the suspension hook 13 can engage in the carrier element 9. After the conveying of the rear vehicle structure 3 is complete, the opening 28 can be closed by means of a closure member 32 which in this instance is, for example, in the form of a formed sheet metal component. The securing of the closure member 32 to the carrier element 9 can, for example, be carried out by means of joining, in particular by means of welding/spot welding. In this instance, the closure member further has a flange 34 by means of which the closure member 32 is also connected to the longitudinal beam 4. Using the closure member, a load path between the carrier element 9 and the longitudinal beam 4 is thereby also closed or reinforced.

LIST OF REFERENCE NUMERALS

1 Conveying installation
2 Suspension gear
3 Rear vehicle structure
4 Longitudinal beam
5 End region
6 Inner component
7 Wheel housing
8 Cross beam
9 Carrier element
10 Heel wall
11 Flange
12 Inner side
13 Suspension hook
14 Transverse element
15 Retention members
16 Legs
17 Legs
18 Receiving contour
19 Contact face
20 Contact face
21 Free space
22 Free space
23 Free space
24 Adapter component
26 Inner side
27 Hollow space
28 Opening
29 End
30 Contact face
31 Contact face
32 Closure member
33 Hook receiving member
34 Flange

The invention claimed is:

1. A body structure for an electrically operable passenger vehicle, comprising:
at least one carrier element by which the body structure is fixable in a region of a receiving contour to at least one receiving element of a conveying installation during production of the passenger vehicle, wherein
the receiving contour on the carrier element is at least partially formed by an adapter component which is arranged on the carrier element,
the adapter component forms respective contact faces for the at least one receiving element, which receiving element is in the form of a suspension hook.

2. The body structure according to claim 1, wherein the adapter component is inserted into a hollow space of the carrier element.

3. The body structure according to claim 1, wherein the body structure is a rear vehicle structure with the carrier element arranged in a region of a heel element.

4. The body structure according to claim 1, wherein the carrier element has an opening through which the suspension hook engages.

5. The body structure according to claim 4, wherein the opening is in a heel wall of the carrier element.

6. The body structure according to claim 4, further comprising:
a closure member that closes the opening.

7. A modular system for a body structure of a passenger vehicle, comprising:
at least one structural-variant-specific carrier element of the body structure, which structural-variant-specific carrier element is selected in accordance with a drive variant of the passenger vehicle, and by which the body structure is fixed, in a region of a receiving contour that covers the structural variants of a plurality of the respective drive variants of the passenger vehicle, to at least one receiving element of a conveying installation during production of the passenger vehicle;
wherein in the region of the receiving contour on the carrier element, an adapter component is arranged for the receiving element and wherein the adapter component forms respective contact faces for the receiving element, which receiving element is in the form of a suspension hook.

8. A method for producing a body structure of a passenger vehicle, comprising:
using a modular system in which at least one structural-variant-specific carrier element of the body structure is provided in accordance with a drive variant of the passenger vehicle, by which carrier element the body structure is fixed, in a region of a receiving contour that covers the structural variants of a plurality of the respective drive variants of the passenger vehicle, to at least one receiving element of a conveying installation during the production of the passenger vehicle, wherein an adapter component is secured to the carrier element in the region of the receiving contour and wherein the adapter component forms respective contact faces for the receiving element, which receiving element is in the form of a suspension hook.

* * * * *